(12) United States Patent
Malone, II et al.

(10) Patent No.: US 10,705,855 B2
(45) Date of Patent: *Jul. 7, 2020

(54) METHOD FOR SECURELY CONFIGURING AN INFORMATION SYSTEM

(71) Applicant: Forcepoint LLC, Austin, TX (US)

(72) Inventors: Mickey J. Malone, II, Rowlett, TX (US); Jacob Minnis, Plano, TX (US)

(73) Assignee: FORCEPOINT LLC, Austin, TX (US)

(*) Notice: Subject to any disclaimer, the term of this patent is extended or adjusted under 35 U.S.C. 154(b) by 169 days.

This patent is subject to a terminal disclaimer.

(21) Appl. No.: 15/826,281

(22) Filed: Nov. 29, 2017

(65) Prior Publication Data

US 2019/0163502 A1 May 30, 2019

(51) Int. Cl.
*G06F 9/445* (2018.01)
*H04L 9/32* (2006.01)
*G06F 21/51* (2013.01)
*G06F 21/57* (2013.01)

(52) U.S. Cl.
CPC .......... *G06F 9/44505* (2013.01); *G06F 21/51* (2013.01); *G06F 21/575* (2013.01); *H04L 9/3236* (2013.01); *H04L 9/3247* (2013.01)

(58) Field of Classification Search
None
See application file for complete search history.

(56) References Cited

U.S. PATENT DOCUMENTS

| 2015/0067838 | A1* | 3/2015 | Gunti | G06F 21/51 726/22 |
| 2017/0372074 | A1* | 12/2017 | Gunti | H04L 9/3247 |
| 2018/0143882 | A1* | 5/2018 | Dodge | G06F 11/1471 |
| 2018/0247059 | A1* | 8/2018 | Nara | G06F 21/6218 |

* cited by examiner

*Primary Examiner* — Kambiz Zand
*Assistant Examiner* — Arezoo Sherkat
(74) *Attorney, Agent, or Firm* — Jackson Walker LLP; Christopher J. Rourk

(57) ABSTRACT

Systems, method, and non-transitory computer readable storage medium are provided for configuring an information computing machine during execution of a kernel image. The system can create a file system from a base file system image in system memory of the computing system, apply configuration files from a bundle image to the file system in memory, copy files from a persistent file system stored in the storage resource to memory, validate the files from the persistent file system, and apply validated files to the file system in memory. The base file system image and bundle image can be verified by comparing a signed hash of the image with a hash generated by the initial file system and checking the hash signature against a public certificate included in the initial filesystem. The system can further execute /sbin/init and start application services.

15 Claims, 2 Drawing Sheets

METHOD FOR SECURELY CONFIGURING AN INFORMATION SYSTEM

TECHNICAL FIELD

The present disclosure relates generally to configuring an Operating System (OS) of a computer system and, more specifically, to securely configuring the OS during a booting processing of a kernel image of the OS.

BACKGROUND

Traditionally, computer systems are configured after the booting process when the disk partitions have been fully mounted and an operating system has been handed over control of a processor by a kernel image of the boot process. Configurations, however, are either done manually or automatically using an automated solution, such as Puppet, Chef, Ansible, and Saltstack. During runtime, configuration typically requires root access, which can lead to malformed configurations and malicious configurations. Either of these can lead to a compromised computer system.

SUMMARY

In one aspect, the present disclosure is directed to a system for configuring an information computing machine during execution of a kernel image. The system can include a storage resource and a processor that is communicatively coupled to the storage resource, wherein the processor executes application code instruction that are stored in the storage resource to cause the system to create a file system from a base file system image in system memory of the information computing system. The system can apply configuration files from a bundle image to the file system in memory, and copy files from a persistent file system stored in the storage resource to memory. The system can also validate the files from the persistent file system and apply validated files to the file system in memory.

In another aspect, the present disclosure is directed to a computer aided method of a system for configuring an information computing system during execution of a kernel image. The method includes creating a file system from a base file system image in system memory of the information computing system and applying configuration files from a bundle image to the file system in memory. The method further includes copying files from a persistent file system stored in the storage resource to memory and validating the files from the persistent file system. The method also includes applying validated files to the file system in memory.

In yet another aspect, the present disclosure is directed to a non-transitory computer readable medium containing computer readable instructions for configuring an information computing machine, where the computer-readable instructions comprising instructions for causing the computing machine to create a file system from a base file system image in system memory of the information computing system. The instructions further cause the computing machine to apply configuration files from a bundle image to the file system in memory and to copy files from a persistent file system stored in the storage resource to memory. In addition, the instructions cause the computing machine to validate the files from the persistent file system and apply validated files to the file system in memory.

In other embodiments of the aspects, the base file system image can be verified by comparing a signed hash of the image with a hash generated by the initial file system image and checking the hash signature against a public certificate included in the initial file system. The bundle image can be verified by comparing a signed hash of the image with a hash generated by the initial file system image and checking the hash signature against a public certificate included in the initial file system. The bundle image can be further verified by determining if the hash has been signed by an administrator. The base file system image can be retrieved from a local storage resource or from a remote storage resource. The bundle image can be retrieved from a local storage resource or from a remote storage resource, and the system or method can execute /sbin/init and start application services.

BRIEF DESCRIPTION OF DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Currently, there is nothing that exists that allows a serviceless daemon, i.e. a process detached from a running operating system, to validate and securely apply a system configuration to an operating system during the booting process. The present disclosure provides solutions wherein validated and verified system configurations are performed during the boot process prior to the actual operating system being executed.

Figure 1:
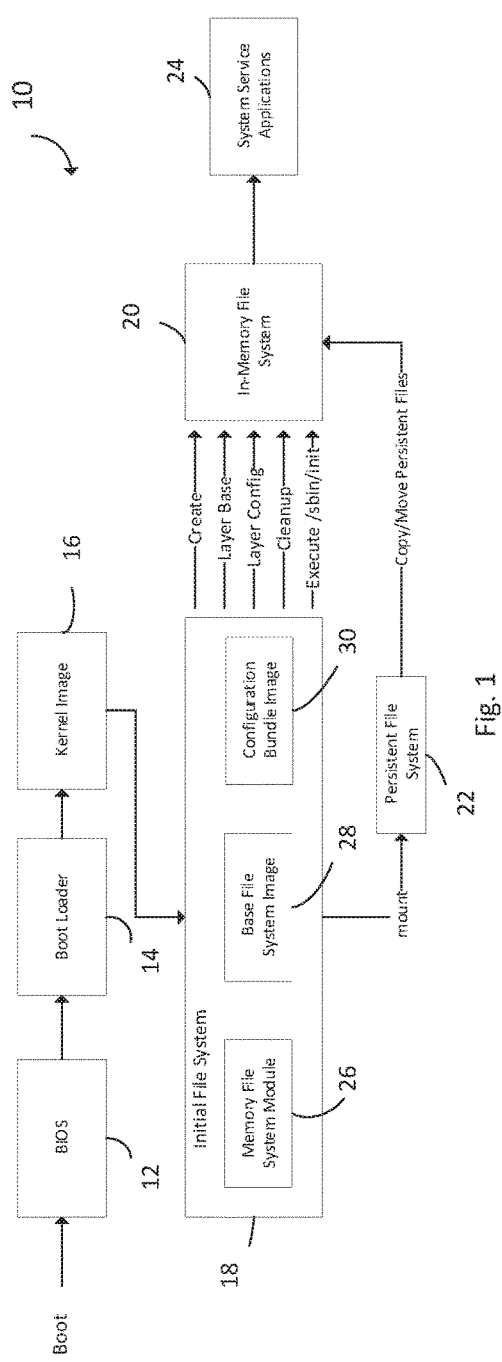
FIG. 1 is a block diagram of a system for booting an operating system, in accordance to certain example embodiments.

Referring to FIG. 1, illustrated is a system for booting an operating system, according to certain example embodiments, denoted generally as 10. The system 10 comprises a Basic Input Output Operating System (BIOS) 12, a boot loader 14, a kernel image 16, an initial file system 18, a memory module 20, a persistent file system 22, and system service applications 24. In the embodiment, BIOS 12 receive a boot command and, in response, launches a boot loader 14. The boot loader 14 launches a kernel image 16. The boot loader 14 and kernel image 16, or only the kernel image 16, can be provided from a trusted source approved for execution on a hardware platform executing the BIOS 12 and only responds to execution commands from a trusted source. In a trusted environment, the kernel image 16 launches the initial file system 18.

The initial file system 18 comprises a memory file system module 26, a base file system image 28, and a configuration bundle image 30. The memory file system module 26 extracts a file system from the base file system image 28 and installs the file system into the memory module 20. The memory file system module 26 further extracts configuration files from configuration bundle image 30 and installs the configuration files into the base file system. The files installed on the file system in memory 20 can include pre-approved system space binaries, and also user space binaries, and configurations files. The initial file system 18 further mounts the persistent file system 22 and either copies or moves files, e.g. all or select system binaries and configuration files, from the mounted file system to the base file system in memory 20. After performing an audit between the pre-approved installed in-memory files and the files installed from the mounted file system, the memory file system module 26 can cause /sbin/init to be executed if the audit passes inspection or halt further operation of the system 10 if the audit doesn't pass inspection. In response to the execution of /sbin/init, the OS system application services are executed.

In this embodiment, once the kernel image 16 has been booted and control is given to the initial file system 18, the memory file system module 26 can read from the kernel command line to identify where to retrieve the base file system image 28. The base file system image 28 can exist on disk or it can be retrieved from a remote system. Once the base system file image 28 has been retrieved it can be validated by the initial file system 18. The initial file system 18 can compute a hash of the base file system image 28 and verify it by comparing the hash against a hash generated from keys and certificates preinstalled with the initial file system 18. If the base file system image 28 is validated, then it can be extracted and the in-memory file system created and the base file system installed.

The base file system image 28 can be built in the factory and, as such, is immutable and can also be updated over a secure network, e.g. a peer-to-peer network, to include updates including relevant and trusted OS updates. In this manner, the installed binaries and configurations files are certain to be trusted application services. In other words, binaries and configurations files installed on the system 10, binaries and configurations from system images and from persisted file system 22, can only be audited as trusted before the system service applications 24 can actually be executed. So, if any changes occur to the binaries and configurations files on the persistent file system 22, or at least a subset of the files, in order for the changes to be permanently effected by the initial file system 18 would require those changes to pass the audit phase. I.e., files in the base image 28, configuration bundle 30 and the persistent file system 22, or a subset, are validated against a whitelist. The whitelist can be a static file that can be built at the factory. If the base image 28, configuration bundle 30, and the file system 22 contains files that are not in the whitelist the system will raise an error and reboot.

The configuration bundle image 30 can be built and signed by designated system and security administrators on the system 10. The bundle image 30 can be an archive that contains the following items; alch.tar; secadmin.crt; secadmin.sig; secadmin.txt; sysadmin.crt; sysadmin.sig; sysadmin.txt. The crt, sig, and txt files can be used to ensure the alch.tar file has not been tampered with. This can be achieved by taking a hash of the alch.tar and having both system and security administrators digitally sign the hash. The alch.tar can be the configuration. It can contain the following items: additional system files; YAML (Yet Another Extensible Markup Language); and counter.txt. The additional system files can be $3^{rd}$ party provided files that can be generated using a markup language other than YAML. Examples include: CDS rule files; certificates; XCCDF Benchmarks; etc. YAML, in this embodiment, can be used to describe the system and how it should be configured. The counter.txt can be used to track the version of the configuration bundle. It can be incremented each time a configuration bundle is built and signed, and can be used to prevent rolling back the system to an old configuration. The configuration bundle can be processed each and every time that the system boots, or in other suitable manners.

After the configuration bundle has successfully been applied to the non-running system, cleanup can occur. This can include running AIDE, applying permissions, setting up SELinux, or anything else that needs to happen to the in-memory file system. Upon completion, the in-memory file system will become the real file system and the system will finish booting and enter into the running state.

Figure 2:
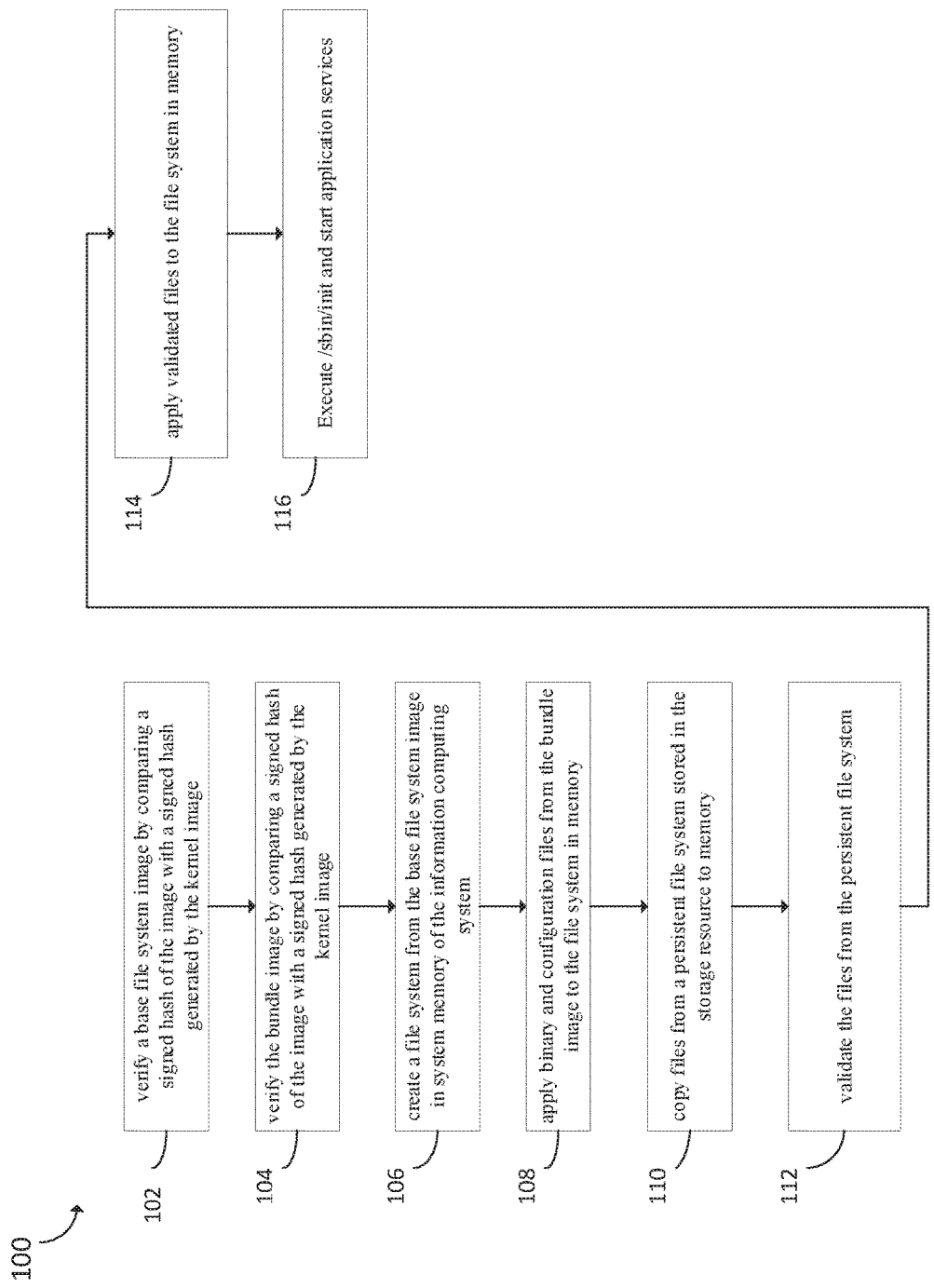
FIG. 2 is a flow diagram of an algorithm for configuring an operating system during execution of a kernel image, according to certain example embodiments.

FIG. 2 is a flow diagram of an algorithm for configuring an information computing system during execution of a kernel image, according to certain example embodiments, denoted generally as 100. The algorithm 100 begins at block 102 by verifying the base file system image 28, such as by comparing a signed hash of the image with a hash generated by the initial file system and checking the hash signature against a public certificate included in the initial file system in other suitable manners. The algorithm 100 continues to block 104, where it verifies the bundle image 30 by comparing a signed hash of the image with a hash generated by the initial file system and checking the hash signature against a public certificate included in the initial filesystem. The algorithm 100 continues, block 106, by creating a file system from the base file system image in system memory of the information computing system. The algorithm 100 further continues, block 108, by applying binary and configuration files from the bundle image to the file system in memory. At block 110, the algorithm 100 continues by copying files from a persistent file system stored in the storage resource to memory. The algorithm 100 further continues, block 112, by validating the files from the persistent file system. The algorithm 100 continues, block 114, by applying validated files to the file system in memory. At block 116, the algorithm 100 continues by executing /sbin/init and starting application services.

Figure 3:
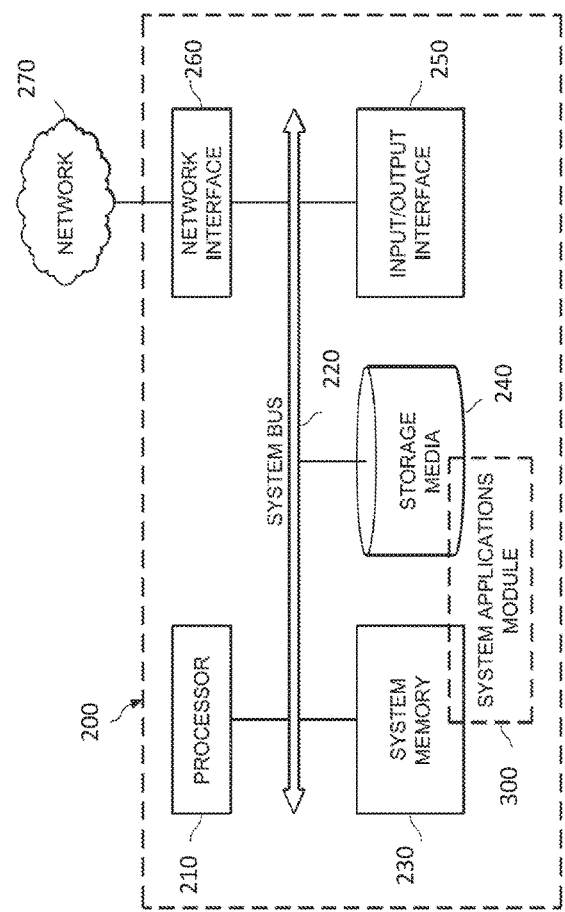
FIG. 3 is a block diagram depicting a computing machine and system applications, in accordance with certain example embodiments.

FIG. 3 is a computing machine 200 and a system applications module 300 in accordance with example embodiments. The computing machine 200 can correspond to any of the various computers, mobile devices, laptop computers, servers, embedded systems, or computing systems presented herein. The module 300 can comprise one or more hardware or software elements that are configured to facilitate the computing machine 200 in performing the various methods and processing functions presented herein. The computing machine 200 can include various internal or attached components such as a processor 210, system bus 220, system memory 230, storage media 240, input/output interface 250, and a network interface 260 for communicating with a network 270.

The computing machine 200 can be implemented as a conventional computer system, an embedded controller, a laptop, a server, a mobile device, a smartphone, a wearable computer, a customized machine, any other suitable hardware platform, or any combination or multiplicity thereof. The computing machine 200 can be a distributed system configured to function using multiple computing machines interconnected via a data network or bus system.

The processor 210 can be configured to execute code instructions in order to perform the operations and functionality described herein, manage request flow and address mappings, and to perform calculations and generate commands. The processor 210 can be configured to monitor and control the operation of the components in the computing machine 200. The processor 210 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other suitable processing unit, or any combination or multiplicity thereof. The processor 210 can be a single processing unit, multiple processing units, a single processing core, multiple processing cores, special purpose processing cores, co-processors, or any combination thereof. According to certain embodiments, the processor 210 along with other components of the computing machine 200 can be a virtualized computing machine executing within one or more other computing machines.

The system memory 230 can include non-volatile memories such as read-only memory ("ROM"), programmable read-only memory ("PROM"), erasable programmable read-only memory ("EPROM"), flash memory, or any other suitable device capable of storing program instructions or data with or without applied power. The system memory 230 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 230. The system memory 230 can be implemented using a single memory module or multiple memory modules. While the system memory 230 is depicted as being part of the computing machine 200, one skilled in the art will recognize that the system memory 230 can be separate from the computing machine 200 without departing from the scope of the subject technology. It should also be appreciated that the system memory 230 can include, or operate in conjunction with, a non-volatile storage device such as the storage media 240.

The storage media 240 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any suitable magnetic storage device, any suitable optical storage device, any suitable electrical storage device, any suitable semiconductor storage device, any suitable physical-based storage device, any other suitable data storage device, or any combination or multiplicity thereof. The storage media 240 can store one or more operating systems, application programs and program modules such as module 300, data, or any other suitable information. The storage media 240 can be part of, or connected to, the computing machine 200. The storage media 240 can also be part of one or more other computing machines that are in communication with the computing machine 200 such as servers, database servers, cloud storage, network attached storage, and so forth.

The system applications module 300 can comprise one or more hardware or software elements configured to facilitate the computing machine 200 with performing the various methods and processing functions presented herein. The module 300 can include one or more sequences of instructions stored as software or firmware in association with the system memory 230, the storage media 240, or both. The storage media 240 can therefore represent examples of machine or computer readable media on which instructions or code can be stored for execution by the processor 210. Machine or computer readable media can generally refer to any suitable medium or media used to provide instructions to the processor 210. Such machine or computer readable media associated with the module 300 can comprise a computer software product. It should be appreciated that a computer software product comprising the module 300 can also be associated with one or more processes or methods for delivering the module 300 to the computing machine 200 via the network 270, any suitable signal-bearing medium, or any other suitable communication or delivery technology. The module 300 can also comprise hardware circuits or information for configuring hardware circuits such as microcode or configuration information for an FPGA or other PLD.

The input/output ("I/O") interface 250 can be configured to couple to one or more external devices, to receive data from the one or more external devices, and to send data to the one or more external devices. Such external devices along with the various internal devices can also be known as peripheral devices. The I/O interface 250 can include both electrical and physical connections for coupling the various peripheral devices to the computing machine 200 or the processor 210. The I/O interface 250 can be configured to communicate data, addresses, and control signals between the peripheral devices, the computing machine 200, or the processor 210. The I/O interface 250 can be configured to implement any suitable standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 250 can be configured to implement only one interface or bus technology. Alternatively, the I/O interface 250 can be configured to implement multiple interfaces or bus technologies. The I/O interface 250 can be configured as part of, all of, or to operate in conjunction with, the system bus 220. The I/O interface 250 can include one or more buffers for buffering transmissions between one or more external devices, internal devices, the computing machine 200, or the processor 210.

The I/O interface 250 can couple the computing machine 200 to various input devices including mice, touch-screens, scanners, electronic digitizers, sensors, receivers, touchpads, trackballs, cameras, microphones, keyboards, any other suitable pointing devices, or any combinations thereof. The I/O interface 250 can couple the computing machine 200 to various output devices including video displays, speakers, printers, projectors, tactile feedback devices, automation control, robotic components, actuators, motors, fans, solenoids, valves, pumps, transmitters, signal emitters, lights, and so forth.

The computing machine 200 can operate in a networked environment using logical connections through the network interface 260 to one or more other systems or computing machines across the network 270. The network 270 can include wide area networks (WAN), local area networks (LAN), intranets, the Internet, wireless access networks, wired networks, mobile networks, telephone networks, optical networks, or combinations thereof. The network 270 can be packet switched, circuit switched, of any suitable topology, and can use any suitable communication protocol. Communication links within the network 270 can involve various digital or an analog communication media such as fiber optic cables, free-space optics, waveguides, electrical conductors, wireless links, antennas, radio-frequency communications, and so forth.

The processor 210 can be connected to the other elements of the computing machine 200 or the various peripherals discussed herein through the system bus 220. It should be appreciated that the system bus 220 can be within the processor 210, outside the processor 210, or both. According to some embodiments, any of the processor 210, the other elements of the computing machine 200, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all suitable combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system for configuring an information computing machine during execution of a kernel image and an initial file system, the system comprising:
    a storage resource;
    a processor communicatively coupled to the storage resource, wherein the processor executes application code instruction that are stored in the storage resource to cause the system to:
    create a file system from a base file system image in system memory of the information computing system;
    apply binary and configuration files from a bundle image to the file system in memory;
    copy files from a persistent file system stored in the storage resource to memory;
    validate the files from the persistent file system;
    apply validated files to the file system in memory; and
    verify the bundle image by comparing a signed hash of the image with a hash generated by the initial file system and checking the hash signature against a public certificate included in the initial filesystem, wherein the initial filesystem includes a memory file system module, a base file system image and the bundle image, wherein the bundle image is further verified by determining if the hash has been signed by an administrator and validated against a white list.

2. The system of claim 1 further comprising application code instruction to cause the system to:
    verify the base file system image by comparing a signed hash of the image that includes a plurality of digital signatures with a hash generated by the initial file system and checking the plurality of digital signatures against public certificates included in the initial filesystem.

3. The system of claim 1 wherein the base file system image can be retrieved from a local storage resource or from a remote storage resource.

4. The system of claim 1 wherein the bundle image can be retrieved from a local storage resource or from a remote storage resource.

5. The system of claim 1 further comprising application code instruction to cause the system to:
    execute /sbin/init; and
    start services.

6. A computer aided method of a system for configuring an information computing system during execution of a kernel image and an initial file system, the method comprising:
    creating a file system from a base file system image in system memory of the information computing system;
    applying configuration files from a bundle image to the file system in memory;
    copying files from a persistent file system stored in the storage resource to memory;
    validating the files from the persistent file system;
    applying validated files to the file system in memory; and
    verifying the bundle image by comparing a signed hash of the image with a hash generated by the initial file system and checking the hash signature against a public certificate included in the initial filesystem, wherein the initial filesystem includes a memory file system module, a base file system image and the bundle image, wherein the bundle image is further verified by determining if the hash has been signed by an administrator and validated against a white list.

7. The method of claim 6 further comprising:
    verifying the base file system image by comparing a signed hash of the image with a hash generated by the initial file system and checking the hash signature against a public certificate included in the initial filesystem.

8. The method of claim 6 further comprising retrieving the base file system image from a local storage resource or from a remote storage resource.

9. The method of claim 6 further comprising retrieving the bundle image from a local storage resource or from a remote storage resource.

10. The method of claim 6 further comprising:
    executing /sbin/init; and
    starting services.

11. A non-transitory computer readable medium containing computer readable instructions for configuring an information computing machine, the computer-readable instructions comprising instructions for causing the computing machine to:
    create a file system from a base file system image in system memory of the information computing system;
    apply configuration files from a bundle image to the file system in memory;
    copy files from a persistent file system stored in the storage resource to memory;

validate the files from the persistent file system;
apply validated files to the file system in memory; and
verify the bundle image by comparing a signed hash of the image with a hash generated by the initial file system and checking the hash signature against a public certificate included in the initial filesystem, wherein the initial filesystem includes a memory file system module, a base file system image and the bundle image, wherein the bundle image is further verified by determining if the hash has been signed by an administrator and validating the bundle image against a white list.

12. The non-transitory computer readable medium of claim 11 further includes computer readable instruction to cause the computing machine to:
verify the base file system image by comparing a signed hash of the image with a hash generated by the initial file system and checking the hash signature against a public certificate included in the initial filesystem.

13. The non-transitory computer readable medium of claim 11 wherein the base file system image can be retrieved from a local storage resource or from a remote storage resource.

14. The non-transitory computer readable medium of claim 11 wherein the bundle image can be retrieved from a local storage resource or from a remote storage resource.

15. The non-transitory computer readable medium of claim 11 further includes computer readable instruction to cause the computing machine to:
execute /sbin/init; and
start services.

* * * * *